Nov. 22, 1966 B. O. AYERS 3,286,530
DETERMINATION OF GASEOUS AFFINITY
Filed Oct. 28, 1963
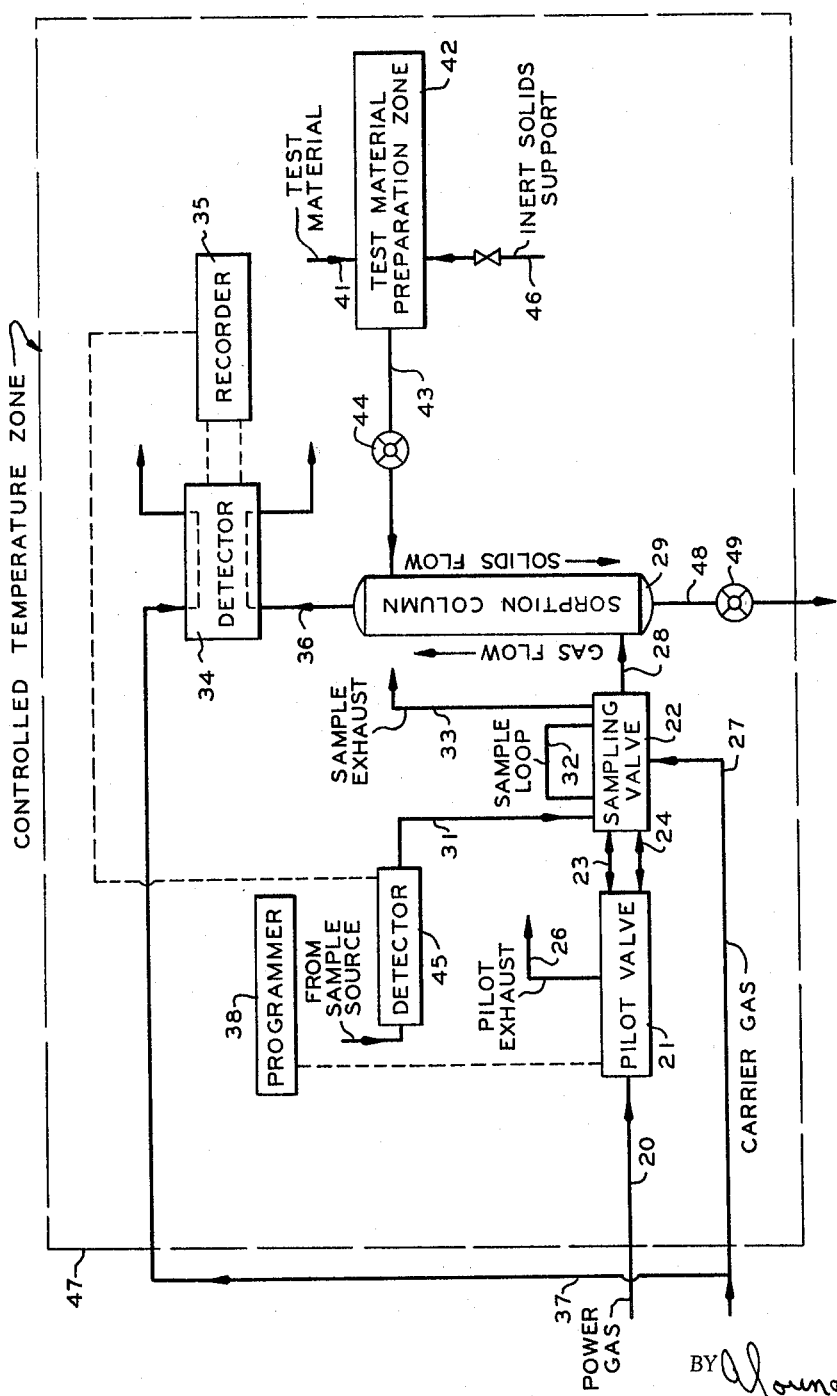
INVENTOR.
B. O. AYERS
BY
ATTORNEYS United States Patent Office 3,286,530
Patented Nov. 22, 1966

3,286,530
DETERMINATION OF GASEOUS AFFINITY
Buell O. Ayers, Bartlesville, Okla., assignor to Phillips Petroleum Company, a corporation of Delaware
Filed Oct. 28, 1963, Ser. No. 319,372
14 Claims. (Cl. 73—432)

This invention relates to a method of measuring a particular property of a material by chromatographic techniques. In one aspect it relates to chromatographic apparatus and application thereof for measuring the oxygen affinity of a polymer or the olefinic unsaturation in an olefin polymer.

Many products, such as polymers have properties which are important to determine as a means of quality control and most efficient utilization thereof. For example, the oxygent affinity of polymers, such as polypropylene, and the degree of olefinic unsaturation in a polyolefin. At present, such measurements of physical properties must be carride out by repetitive laboratory tests which are time consuming and expensive. A means of more simply and quickly determining such measurements is much sought after.

It is known to perform analyses of mixtures of gases by separating them through the technique of elution chromatography. In this technique, a sample of the material that is to be analyzed is introduced into the column which contains a sorbent. The sorbent retains the material in a selective manner and the various constituents of the material, which is ordinarily a mixture of gases, are individually desorbed by passing a carrier gas through the column. The desorption takes place at varying rates, and the result is that each constituent tends to elute from the sorbent at a different time than do the other constituents. The column effluent thus consists initially of the carrier gas, with the individual constituents of the fluid mixture appearing at later spaced intervals. It is common practice to detect these constituents by means of a thermal conductivity analyzer which compares the thermal conductivity of the effluent gas with the thermal conductivity of the carrier gas introduced into the column. This particular technique ordinarily requires a batch or intermittent (sampling) type of operation.

It is therefore, an object of this invention to provide a method and means of adapting chromatography to fast and inexpensive measurement of a particular property of a test material.

It is another object of this invention to provide a moving bed sorption column adapted to permit adsorption of a gaseous component flowing countercurrently to a particulate material having an affinity therefor.

A still further object of this invention is to provide a method for measuring the oxygen affinity of a polyolefin.

Various other objects, aspects, and advantages of the invention will become apparent to those skilled in the art from a study of the disclosure, the appended claims and accompanying drawing.

According to the present invention, a conventional chromatographic analyzer is modified to permit the sorption column component thereof to be operated as a moving bed, by flowing a gaseous mixture upwardly through the column, countercurrently to a downwardly flowing particulate material which has an affinity for one of the components of the gaseous mixture. For example, a polymer, such as polypropylene which has a varying degree of affinity for free oxygen, is comminuted to particulate form and introduced downwardly into the top of the column. A free oxygen-containing gas, most conveniently air, is first analyzed to determine its oxygen content, and then introduced upwardly from the bottom of the column. During the test material's retention time some of the free oxygen will be absorbed thereby. The partially oxygen depleted gaseous effluent is passed from the column to another oxygen analyzer which measures the reduced oxygen concentration. The two measurements are compared, the difference being representation of the oxygen affinity of the particular sample of polymer tested. The result is characterized by a numerical value referred to as the sorptive coefficient.

In another embodiment, a slug of the oxygen-containing gas mixture is periodically introduced into the column countercurrent to a downwardly flowing particulate material, such as polypropylene or linear polyethylene, the oxygen being partially absorbed by the latter. An inert carrier gas is first passed through a conventional detector to establish a reference signal, and then is flowed continuously thru the column to elute the adsorbed oxygen and other components from the polymer. The gaseous effluent is passed thru a conventional component peak detector to record the relative retention times of the effluent components, from which the oxygen adsorption tendency of the polymer can be readily calculated.

In a third embodiment, a property of a normally liquid material may be measured by slight modification of disclosed apparatus. Means are provided for admixing the test liquid with an inert particulate solid, in a quantity sufficient to provide a solid having a substantially liquid-covered surface and suitable for flowing down through the column, countercurrent to the carrier gas and oxygen flowing up the column.

Reference is now made to the drawing in detail, wherein like parts have been designated by like reference numerals, and to FIGURE 1 in particular, wherein a power gas, such as air, passes via conduit 20 to pilot valve 21, wherein the power gas stream is directed to a first side of a pneumatically-actuated, diaphragm-sealed sampling valve 22 via conduit 23. Meanwhile, the second side of sampling valve 22 is being vented via conduit 24, pilot valve 21, and pilot exhaust conduit 26. A carrier gas, such as helium or hydrogen, is passed via conduit 27, sampling valve 22, and conduit 28 to column 29. A gaseous sample from the process stream, introduced to sampling valve 22 via conduit 31, is being circulated through sample loop 32 of sampling valve 22 and vented therefrom via sample exhaust conduit 33. Periodically, the sample in loop 32 is passed along with the carrier gas, via conduit 28, to sorption column 29, where constituents of the sample to be identified and measured, are absorbed or adsorbed, depending upon the nature of the test material, and then are selectively desorbed by a continuing flow of carrier gas therethrough.

The effluent from the sorption column 29 passes through a detector, indicated as thermal conductivity assembly 34, via conduit 36. Detector 34 is an oxygen analyzer in the one embodiment. The output signal from the detector 34 is passed to a recording instrument 35, which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system continuously through conduit 31. It is exhausted through conduit 33, even when a slug thereof is selected for analysis. Pilot valve 21 is actuated by programmer 38, which can be operated by a time cycle or other means. For a detailed discussion of the design and manner of operation of a typical pilot valve which can be used in conjunction with this invention, see the copending application of Emmerich Guenther, Serial No. 858,997, filed December 11, 1959, now U.S. Patent No. 3,176,516.

Typically the gaseous sample comprises free oxygen and another gas inert to the test material, such as one of the noble gases, neon, argon, krypton, or xenon. The retention times for these noble gases, compared to oxygen, are about the same.

A test material enters the present system via conduit 41 passing to test material preparation zone 42. In the case of a solid material, it is comminuted therein by methods well known in the art, to a flowable size, and passes via conduit 43 through a gas-tight valve 44, such as a rotary valve, to the upper portion of column 29 to be introduced downwardly therein.

In the event that the test material is a liquid, it is still passed via conduit 41 to zone 42 wherein it is admixed with an inert particulate solid, such as fine sand, introduced via valved conduit 46 in quantity sufficient to give a test liquid-wetted sand suitable for flowing through column 29. Column 29 is preferably agitated by conventional vibratory means (not shown) to facilitate maintenance of a moving bed therein. The system can then be operated according to the free oxygen injection system of either the first or second embodiment.

A suitable sampling valve for use as element 22 in this invention is described in copending application Serial No. 96,773 filed March 20, 1961, of A. B. Broerman, now U.S. Patent No. 3,111,849. The embodiment of FIGURE 6 of said application showing an internal sample loop is particularly adaptable to providing the volume of sample slug indicated in this invention.

A suitable detector and flow controller for use as element 34 in this invention is described in U.S. Patent 3,056,278 to E. Guenther, issued October 2, 1962.

In the first described embodiment where the free-oxygen containing gas mixture is continuously introduced into the column, all the components needed for sample slug injection can be dispensed with. Instead the gas mixture is flowed thru an oxygen analyzer 45 to determine its oxygen content, and then is introduced directly into the bottom of the column. The output signal from 45 is passed to recording instrument 35. Nor is carrier gas required to elute the gaseous mixture thru the moving bed column, in this embodiment. Detector 34 is an oxygen analyzer in this embodiment. The indicated measurements of oxygen concentration are compared, the difference being representative of the magnitude of the oxygen affinity of the polymer.

A continuous or cyclic oxygen analyzer may be used with this invention. The free oxygen admixed with helium or hydrogen is flowed through inlet analyzer 45, wherein a split-off stream may be analyzed by chemical methods for oxygen concentration. As to outlet analyzer 34, oxygen content can be determined by total destruction of the sample, since it will not be further used.

Under certain conditions relating to the differential in oxygen concentration, thermal conductivity cells may be employed to analyze for free oxygen in inert carrier gas. The signals from the T.C. detectors 45 and 34 will be passed to recorder 35 where two continuous lines will be recorded. The differential of the two lines is representative of the change in oxygen concentration due to countercurrent contact with the test material in column 29.

It is possible to operate the analysis system by having sorption column 29 in the horizontal position. Since gravity flow of the test material can not be utilized here, the column can be adapted to carry an auger along the axis thereof with gas seals at both ends, in order to move the material countercurrently therethrough.

The injector, column and detector are operated within a zone 47 of controlled temperature. It is further possible to program different operating temperatures to determine, for example, the oxygen affinity of a polymer as a function of polymer temperature. Accumulating particulate solid is conveniently removed through bottom conduit 48, having a gas-tight valve 49 disposed therein.

The present invention may readily be adapted to a countercurrent falling film system, particularly where a viscous liquid is the test material. Modification of a sorption column to operate in this manner is disclosed in my copending application Serial No. 196,422, filed May 21, 1962, now U.S. Patent No. 3,162,036.

Adsorption of oxygen by the polymer can also be determined by cyclically adding a "sample" of a mixture of $N_2$ and $O_2$ to the column through which the granular polymer is flowing, eluting the $N_2$, $O_2$ mixture through the column with helium or other carrier gas not absorbed by the polymer, and measuring the relative retention time of oxygen relative to that of nitrogen. The ratio of the retention time of oxygen ($t_{O2}$) to that for nitrogen ($t_{N2}$) is equal to $$t_{O2}/t_{N2} = (1 + k_1)$$

where $k_1$ is the capacity ratio of the column packing, which is proportional to the adsorption of oxygen by the granular polymer.

Many other properties of granular materials or liquids can be determined by varying the mixture of mobile gas phase used. For example, the degree of water wettability or penetrability of a polymer can be studied by employing water vapor as a component of the mobile gas phase. It is within the scope of the invention to determine concurrently the oxygen and water adsorptivity of the test material by injecting the appropriate three component gas mixture. A measure of any other properties of a granular solid or liquid which can be related to adsorption or solubility of a constituent of the mobile phase, hence to changes in relative concentrations of components of the gas phase or to changes in relative retention times of components of the gas phase can be measured in a similar manner.

EXAMPLE I

Determination of the sorptive coefficient ($K_{O2}$) of granular linear polyethylene for free oxygen is performed as follows:

Sorption column 29 has the dimensions of 0.25" in diameter by 60" in length. The carrier gas flowing in supply conduits 27 and 37 is helium. The power gas entering via conduit 20 is air. The previously identified thermal conductivity detector and flow controller of E. Guenther is employed as element 34. The previously identified pilot valve of E. Guenther is employed as element 21. The previously identified sampling valve of A. Broerman is employed as element 22. Oxygen analyzer 45 is not required in this embodiment of the invention.

The apparatus embodiment in which a slug of free oxygen containing gas is periodically introduced into the sorption column will now be described.

The sample (test) gas flowing through conduit 31 is a mixture of 50 volume percent argon and 50 volume percent oxygen. The helium flow rate is 60 cc./minute giving a linear gas velocity ($\mu_O$) at column outlet conduit of 6.44 cm./sec. The ratio of the inlet helium pressure, $P_i$, to the outlet helium gas pressure, $P_o$ is $P = P_i/P_o = 1.50$. The mass flow rate of particulate polyethylene introduced via conduit 43 is 1.6 grams/minute, equivalent to a downward linear velocity of 0.167 cm./sec. The granules range from 60 to 80 mesh. The temperature of column is maintained at 75° F. The internal loop of sampling valve 22 is sized to give a sample gas slug of 200 microliters.

Granular polyethylene flows continuously downwardly, and helium gas flows countercurrently upwardly, each at the aforementioned flow rates. Once every 15 minutes, programmer 38 actuates pilot valve 21, to inject a 200-microliter sample of test gas from the sample loop into the helium stream flowing to the lower end of column 29. Elution of the argon and oxygen constituent of the injected sample is detected by means of the detector 34. Retention times are measured from the moment of sample injection to the maximum peak height for each constituent. Typical retention times for argon ($t_A$) are 30 seconds. Typical retention times for oxygen ($t_{O2}$) are 36 seconds.

Under these conditions the value of the capacity ratio for oxygen ($k_{O2}$) is:

$$k_{O2}=\frac{t_{O2}-t_A}{t_A}=\frac{36-30}{30}=0.2$$

The sorptive coefficient ($K_{O2}$) is related to the capacity ratio ($k_{O2}$); the volume of polyethylene in the column ($V_P$); and the free gas volume in the column ($V_G$) generally as follows:

$$K_{O2}=\frac{V_G}{V_P}k_{O2}$$

The ratio $V_G/V_P$ will vary from case to case and is readily computed by those skilled in the art, as will be demonstrated below:

$V_G$ can be calculated from the value of the residence time for the argon peak, $t_A$, the outlet carrier gas flow rate, $F_O$, and the pressure correction term $$j=\frac{3}{2}\frac{(P^2-1)}{P^3-1}=\frac{3}{2}\frac{(2.25-1)}{(3.38-1)}=\frac{3}{2}\cdot\frac{1.25}{2.38}=0.787$$

as follows:

$$V_G=\frac{F_O t_A}{60}\cdot j=\frac{60}{60}\cdot 30\cdot 0.787=23.6 \text{ cm.}^3$$

The volume of polymer, $V_P$, can then be obtained by subtracting the free gas volume, $V_G$, from the internal volume of the unpacked column, $V_C$, where $$V_C=\pi\frac{Di^2}{4}$$

where $Di$ is the internal diameter of the column tube.

$$V_P=V_C-V_G$$

In the example previously cited:

$$V_C=48.1 \text{ cm.}^3$$

so that $V_P = 48.1 - 23.6 = 24.5$ cm.$^3$.

The expression relating $K_{O1}$ and $k_{O2}$ can then also be written as $$K_{O2}=k_{O2}\frac{60V_C}{F_O t_A j}-1$$

as well as $$K_{O2}=\frac{V_C}{V_P}k_{O2}$$

Using the latter equation:

$$K_{O2}=\frac{23.6}{24.5}\cdot 0.2$$

$$K_{O2}=0.19$$

The value of 0.19 determined in this example, has the dimensions of grams of oxygen absorbed per cubic centimeter of the granular polyethylene. The value will vary, of course, being indicative of the oxygen affinity of the polyolefin material flowing through the column at the time of the gaseous mixture injection.

A different range of values will be experienced for different test materials, flow rates, operating temperatures and the like.

EXAMPLE II

To demonstrate the simultaneous determination of sorptive coefficients of a material for two different solutes, the example previously cited will be extended to include the determination of the sorptive coefficient water on granular polyolefin.

All the experimental conditions are the same as given in previous example with the corrected flow rates and linear velocities as given above. The test gas in this case consists of an argon, oxygen mixture saturated with water vapor.

A typical chromatogram for a two solute system will have retention time as follows:

$$t_A = 30 \text{ sec.}$$
$$t_{O2} = 36 \text{ sec.}$$
$$t_{H2O} = 60 \text{ sec.}$$

The value of $K_{O2}$ is the same as that previously computed.

$$k_{H_2O}=\frac{t_{H_2O}-t_A}{t_A}=\frac{60-30}{30}=1.0$$

$$K_{H_2O}=\frac{V_G}{V_P}k_{H_2O}=0.96\times 1.0=0.96$$

Reasonable variation and modification are possible within the scope of the foregoing disclosure, the drawing and the appended claims to the invention.

I claim:
1. A method for measuring a property of a material by chromatography, comprising:
   introducing the material in flowable form into the upper portion of a sorption column;
   passing a gas mixture comprising a component to be selectively adsorbed by said flowable material, thru a first measurement device adapted to indicate the concentration therein of said adsorbable component;
   introducing said gas mixture into the lower portion of said sorption column in countercurrent flow with the downwardly flowing material at a flow rate adapted to maintain a moving bed therein;
   passing the gaseous effluent from the upper portion of said zone thru a second measurement device similarly adapted to indicate the new concentration of said adsorbable component;
   comparing the indicated measurements on said devices, the difference being representative of the magnitude of the property of said material to be determined; and
   withdrawing accumulating flowable material from the lower portion of said column.

2. A method for measuring a property of a material by chromatography; comprising:
   reducing the material to be analyzed to a physical form suitable for flowing thru a moving bed sorption column;
   introducing the material in flowable form into the upper portion of said sorption column;
   passing a gas mixture comprising a component to be selectively adsorbed by said flowable material thru a first measurement device adapted to indicate the concentration therein of said adsorbable component;
   introducing said gas mixture into the lower portion of said sorption column in countercurrent flow with the downwardly flowing material at a flow rate adapted to maintain a moving bed therein;
   passing the gaseous effluent from the upper portion of said zone thru a second measurement device similarly adapted to indicate the new concentration of said adsorbable component;
   comparing the indicated measurements on said devices, the difference being representative of the magnitude of the property of said material to be determined; and
   withdrawing accumulating flowable material from the lower portion of said column.

3. A method for measuring the oxygen affinity of a polymer by chromatography, comprising:
   comminuting the polymer to be analyzed to particulate form of a size suitable for flowing thru a moving bed sorption column;
   introducing the particulate polymer into the upper portion of said sorption column;
   passing a gas mixture containing an oxidizing gas component thru an oxygen analyzer adapted to indicate the concentration of oxygen therein;

introducing said gas mixture into the lower portion of said sorption column in countercurrent flow with the downwardly flowing polymer at a flow rate adapted to maintain a moving bed therein;

passing the gaseous effluent from the upper portion of said zone thru a second oxygen analyzer similarly adapted to indicate the new concentration of said adsorbable component;

comparing the indicated measurements on said analyzers, the difference being representative of the oxygen affinity of said polymers; and withdrawing accumulating particulate polymer from the lower portion of said column.

4. The method of claim 2 wherein said polymer is a polyolefin.

5. The method of claim 2 wherein said gas mixture is air.

6. A method for measuring the oxygen affinity of a polymer by vapor phase chromatography, comprising:

introducing particulate polymer into the upper portion of a column;

periodically introducing a slug of gas mixture containing a free-oxygen component into the lower portion of said column;

passing an inert carrier gas through a detector to determine a reference standard;

continuously introducing said inert carrier gas into said lower portion in countercurrent flow with the downwardly flowing polymer at a flow rate adapted to maintain a moving bed therein;

passing the gaseous effluent from the upper portion of said zone through a component peak detector to determine the relative retention times of said gas mixture components;

measuring the oxygen affinity of said polymer from the foregoing determinations; and withdrawing accumulating particulate polymer from the lower portion of said column.

7. A method for measuring the oxygen affinity of a polymer by vapor phase chromatography, comprising:

comminuting the polymer to be analyzed to particulate form of a size suitable for flowing through a moving bed column;

introducing particulate polymer into the upper portion of said column;

periodically introducing a slug of gas mixture containing a free-oxygen component into the lower portion of said column;

passing an inert carrier gas through a detector to determine a reference standard;

continuously introducing said inert carrier gas into said lower portion in countercurrent flow with the downwardly flowing polymer at a flow rate adapted to maintain a moving bed therein;

passing the gaseous effluent from the upper portion of said zone through a component peak detector to determine the relative retention times of said gas mixture components;

measuring the oxygen affinity of said polymer from the foregoing determinations; and withdrawing accumulating particular polymer from the lower portion of said column.

8. The method of claim 7 wherein said polymer is linear polyethylene.

9. The method of claim 7 wherein said gas mixture comprises argon and oxygen.

10. A method for measuring a property of a normally liquid material by chromatography, comprising:

admixing said liquid with an inert particulate solid to give a liquid-wetted solid suitable for flowing through a moving bed sorption column;

introducing the flowable material into the upper portion of said sorption column;

passing a gas mixture comprising a component to be selectively adsorbed by said flowable material thru a first measurement device adapted to indicate the concentration therein of said adsorbable component;

introducing said gas mixture into the lower portion of said sorption column in countercurrent flow with the downwardly flowing material at a flow rate adapted to maintain a moving bed therein;

passing the gaseous effluent from the upper portion of said zone thru a second measurement device similarly adapted to indicate the new concentration of said adsorbable component;

comparing the indicated measurements on said devices, the difference being representative of the magnitude of the property of said material to be determined; and withdrawing accumulating flowable material from the lower portion of said column.

11. A method for measuring a property of a normally liquid material by chromatography, comprising:

admixing said liquid with an inert particulate solid to give a liquid-wetted solid suitable for flowing through a moving bed sorption column;

introducing the flowable material into the upper portion of said sorption column;

periodically introducing a slug of gas mixture containing a free-oxygen component into the lower portion of said column;

passing an inert carrier gas through a detector to determine a reference standard;

continuously introducing said inert carrier gas into said lower portion in countercurrent flow with the downwardly flowing polymer at a flow rate adapted to maintain a moving bed therein;

passing the gaseous effluent from the upper portion of said zone through a component peak detector to determine the relative retention times of said gas mixture components;

measuring the oxygen affinity of said liquid from the foregoing determinations; and withdrawing accumulating material from the lower portion of said column.

12. A chromatographic apparatus for measuring a property of a material comprising:

an elongated tubular column adapted to be subjected to repetitive vibratory motion;

first conduit means for introducing the material into the upper portion of said column downwardly in flowable form;

a source of a gas mixture comprising a component selectively adsorbed by said flowable material;

a first detector adapted to indicate the concentration therein of said adsorbable component;

second conduit means adapted to flow said gas mixture through said first detector;

third conduit means to introduce said gas mixture into the lower portion of said column in countercurrent flow with the downwardly flowing material and at a flow rate adapted to maintain a moving bed therein;

a second detector similarly adapted to measure the concentration of said adsorbable component;

fourth conduit means to conduct the gaseous effluent from the upper portion of said column through said second detector;

fifth conduit means to withdraw accumulating material from the lower end of said column; and means to compare the measurements recorded by said detectors, and give a signal representative of magnitude of the property being determined.

13. The apparatus of claim 12 wherein both said detectors are oxygen content analyzers.

14. A chromatographic apparatus for measuring the oxygen affinity of a polymer of an olefin, comprising:

an elongated tubular column adapted to be subjected to repetitive vibratory motion;

means to comminute said polymer to particulate form to a size suitable for flowing through said column;

first conduit means for introducing the material into the upper portion of said column downwardly in flowable form;
a source of a free-oxygen containing gas;
an inert carrier gas first detector;
second conduit means adapted to flow carrier gas through said first detector;
sampling means to periodically inject a fixed volume slug of said free-oxygen containing gas into the lower portion of said column;
third conduit means for continuously introducing inert carrier gas into said lower portion via said sampling means to elute the adsorbed oxygen from said polymer;
a component peak detector;
fourth conduit means to conduct effluent from the upper portion of said column through said peak detector;
recorder means to indicate the relative retention times of the components of said gas, and give a signal representative of the difference; and
fifth conduit means to withdraw accumulating material from the lower end of said column.

No references cited.

RICHARD C. QUEISSER, *Primary Examiner.*